United States Patent Office 3,229,206
Patented Jan. 11, 1966

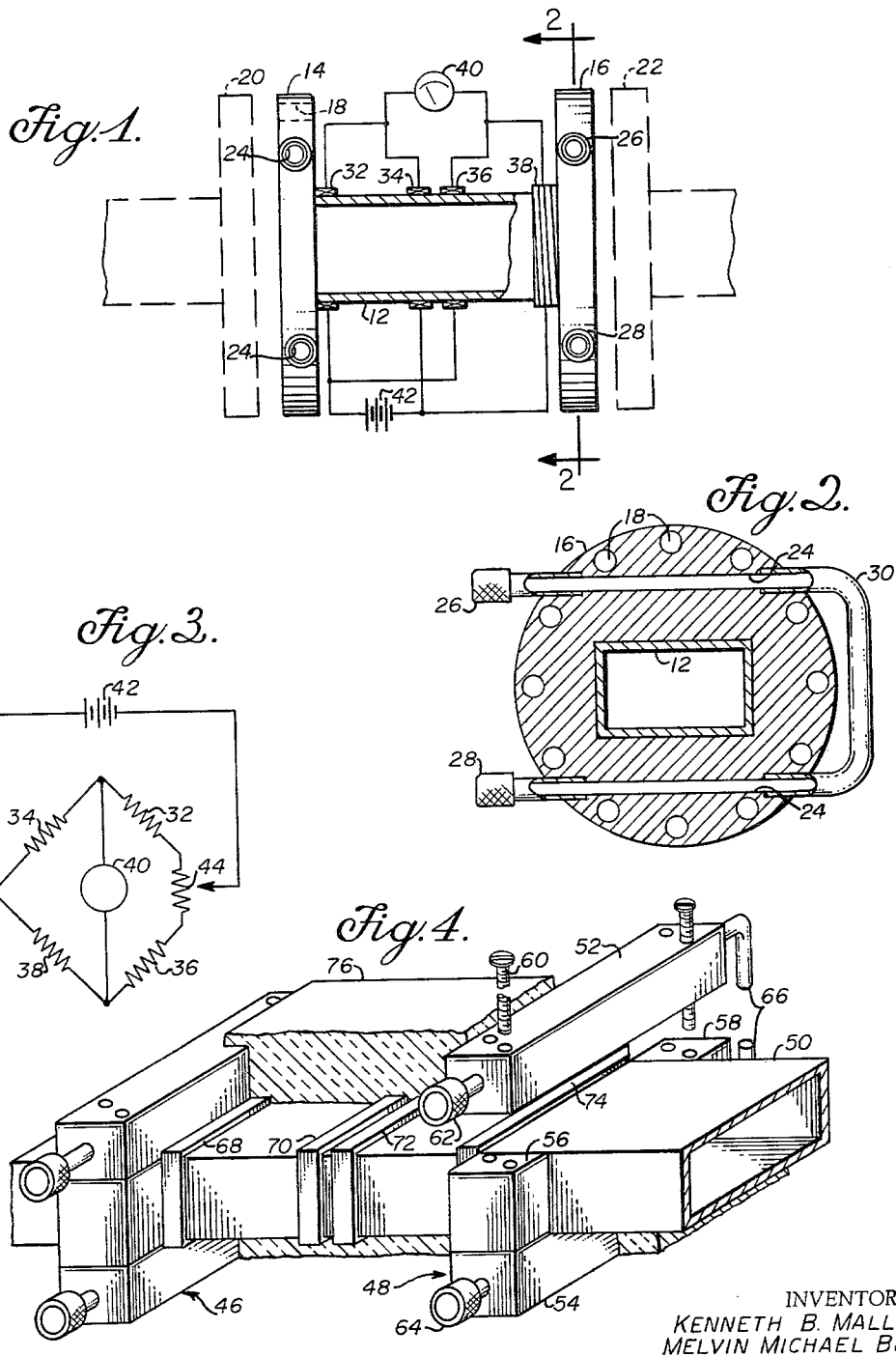

3,229,206
IN-LINE WAVEGUIDE CALORIMETER WATT-
METER USING SPACED HEAT SINKS AND
TEMPERATURE MEASURING MEANS THERE-
BETWEEN
Melvin Michael Brady, Menlo Park, and Kenneth B.
Mallory, Palo Alto, Calif., assignors to the United
States of America as represented by the United States
Atomic Energy Commission
Filed May 14, 1962, Ser. No. 194,737
5 Claims. (Cl. 324—95)

The present invention relates generally to an apparatus for measuring the average level of a high-power microwave signal that flows through a waveguide and, particularly, to an in-line waveguide calorimeter for microwave power measurement.

In present high-pulsed-power microwave systems, the possibility of electrical breakdown is an important consideration. Therefore, such systems must contain few discontinuities and must often be either evacuated or pressurized. Such essential properties for a microwave system present additional complications when measurements are to be made of the power in a waveguide system, for not only must a proposed instrumentation scheme be capable of handling a portion of the high-pulsed power and its corresponding high average power level, but often must also conform to the mechanical requirements dictated by the vacuum or pressure system. In general, high-power measurement schemes utilized at the present time involve the use of auxiliary devices which are directly inserted within the walls of a waveguide system; a practice which tends to impose the dual problems of electrical breakdown due to the close proximity of related components, and breakdown caused by any vacuum or pressure leaks which may occur where the auxiliary device is inserted. Therefore, the preferred operating requirements for a device utilized in a high-power measurement scheme are that it has a simple waveguide configuration, that it is reliable, inexpensive, and easily serviced, and that it does not interfere with existing waveguide construction and operation.

There are various types of flow calorimeters which satisfy the foregoing requirements. Such flow calorimeters operate on the theory that if a part of a waveguide structure absorbs power and passes such power onto a fluid in intimate contact therewith, or if the fluid itself absorbs the microwave power, then ordinary flow calorimetric means can be used to measure the heat rise in the liquid and thus provide an indication of the power present in the waveguide. Despite the possible accuracy of a carefully made system of this type, the amount of associated instrumentation may become excessive if the power meter is to be used as a simple monitor.

The present invention overcomes the foregoing shortcomings by providing a static, adiabatic, dry calorimeter with the inherent advantage of being built with very little associated instrumentation. For example, if a short section of relatively lossy waveguide of known attenuation is arranged with a heat sink at either end and is well insulated throughout its length, then the temperature distribution between its ends is a function of the heat dissipated in the section and, thus, of the total waveguide average power. That is, the absorption of power in the walls of the waveguide will cause the center thereof to be elevated in temperature above the ends. The temperature difference between the center and the ends of the section is directly proportional to the power absorbed, and thus to the power transmitted through the section of waveguide. The heat sinks may be in the form of flanges permanently affixed, as by welding, to a predetermined length of waveguide, or preferably may be constructed in the form of clamps which are demountably attached about an existing waveguide. A temperature-sensing device, such as a resistance-wire bridge or a thermopile, is then used to obtain a direct electrical indication of the waveguide average power. Such a static, adiabatic, in-line dry calorimeter, as described above, may be built without disturbing the existing waveguide of a system; the dry calorimeter of the present invention, therefore, has been selected as the most versatile and preferred device for high-power waveguide monitoring.

Therefore, it is an object of the present invention to provide a simple, reliable, and inexpensive device for monitoring the average level of a high-power microwave signal in a microwave system.

It is another object of the present invention to provide a static, in-line calorimeter which measures the temperature rise in the walls of a waveguide caused by the attenuation of microwave power flowing through the waveguide.

It is yet another object of the present invention to provide a static calorimeter designed to fit on a waveguide portion already existing in a microwave system.

It is still a further object of the present invention to provide a static calorimeter which utilizes no active circuitry.

It is yet another object of the present invention to provide an in-line calorimeter having a length equal to an integral number of waveguide wavelengths, to thereby be insensitive to standing wave patterns in the waveguide and simply read the sum of the average incident and the average reflected powers.

Still another object of the present invention is to provide an in-line calorimetric power meter which allows measurement of the microwave power in a microwave system without sampling from the waveguide power passing therewithin.

A further object of the present invention is to provide an in-line calorimeter which utilizes the waveguide itself as a heat dissipating medium.

Other objects and advantages will be apparent in the foregoing description and claims considered together with the accompanying drawing, in which:

FIGURE 1 is a partial cross section of an embodiment of the present invention utilizing a flange configuration;

FIGURE 2 is a cross-sectional view taken along line 2—2 of FIGURE 1;

FIGURE 3 is a schematic circuit diagram exemplifying the circuit which may be utilized with the present invention; and FIGURE 4 is a perspective view of another embodiment of the present invention utilizing a clamp-on configuration.

In FIGURE 1 there is shown a static, in-line calorimeter comprising a predetermined length of copper or stainless steel waveguide 12, at each end of which is welded a flange 14 and flange 16. Both flanges 14 and 16 have axially extending holes bored therethrough and along the outer circumference thereof in order to allow mounting the calorimeter in position between adjacent portions 20 and 22 of an existing waveguide system. Both flanges 14 and 16 are provided with passageways 24, preferably extending therethrough parallel to the longer width of the waveguide 12. The passageways are provided with inlet and outlet connectors 26 and 28, respectively, as well as an interconnecting exterior pipe 30, which couples the opposite ends of the passageways 24 to provide a complete flow path for the passage of a coolant fluid. Therefore, connectors 26, 28, passageways 24, and interconnecting pipe 30 of the flanges 14 and 16 comprise a heat-sink (or coolant) means located at either end of the waveguide length 12. The coolant means described herein for making a heat sink of the flanges 14, 16 may be any suitable circulatory fluid-passage means and is not limited to the configuration shown herein. Four wire resistances 32, 34, 36, and 38 are wound, generally in perpendicular relation, about the length of the waveguide 12 between the flanges 14 and 16. Wire resistance 32 is wound upon the waveguide immediately adjacent the flange 14, and wire resistance 38 is wound immediately adjacent the flange 16. Resistances 34 and 36 are wound adjacent to one another in the center of the waveguide 12 between resistances 32 and 38. Resistances 32, 34, 36, and 38 are connected in the form of a resistance bridge circuit, as well known in the art (see FIGURE 3). The output voltage of the calorimeter is read on a voltmeter 40, and the input voltage to the bridge circuit is supplied by power supply 42. FIGURE 3 shows a preferred schematic diagram of the bridge circuit indicating the resistances 32, 34, 36, and 38, as well as output voltmeter 40 and input power supply 42. A small trimmer resistor 44 has been inserted between resistances 32 and 36 to provide a means for balancing the bridge circuit (a zero reading on voltmeter 40) to obtain a reference value.

In FIGURE 4 there is shown a preferred embodiment of the present invention wherein the flanges 14, 16 of previous mention are replaced by demountable heat-sink clamps 46 and 48. Such demountable clamps 46 and 48 may be assembled about a portion 50 of an existing waveguide system without disturbing the system. The clamps 46 and 48 may be made of any suitable arrangement of parts. For example, as in clamp 48 of FIGURE 4, two identical bars 52 and 54 extend the longer width of the existing waveguide portion 50 and are assembled to portion 50 and spacer bars 56 and 58 disposed along the shorter width thereof; the bars 52 and 54 being mounted by means of bolts 60 to the ends of the spacer bars 56 and 58. The dimensions of bars 52, 54, 56, and 58 are such as to provide a very tight fit between the waveguide portion 50 and the clamps 46 and 48 in order to provide optimum conditions of heat transfer between the heat sink (clamps 46, 48) and the waveguide portion 50 walls. As in flanges 14, 16, fluid circulation is provided within the clamps 46, 48, more particularly by means of passageways along the length of each bar 52 and 54, with inlet and outlet connections 62, 64 thereto, and an interconnecting pipe 66 therebetween. Temperature measurements are made by utilizing resistances 68, 70, 72, 74 of a resistance bridge circuit, the resistances being wrapped about the existing waveguide portion 50 in the same manner as described in relation to the embodiment of FIGURE 1. It should be noted that on both the embodiments (FIGURES 1 and 4), the entire device is insulated by a suitable layer 76 of insulating material, for example, foam plastic, to reduce convection and radiation heat losses.

To minimize the error in reading the true sum of the average incident and average reflected powers passing through the calorimeter, the length thereof (or the distance between the heat sinks) should be made equal to an integral number of waveguide wavelengths at the frequency of the power being measured.

It is likewise to be understood that any method of measuring the specific temperature difference between the center and the ends of the calorimeter of the present invention may be utilized. For example, a thermopile device (utilizing thermocouples) may be used in place of the resistance-wire bridge circuit. The resistance-wire bridge described herein has the advantage of providing as large a signal output as desired, and was therefore employed. In theory, if four identical temperature-sensitive resistances are placed in contact with the waveguide and connected in a bridge circuit, the output of the bridge becomes an indication of the temperature difference between the middle and the ends of the waveguide. Assume the sections of waveguide portion 50 (about which the outer resistances 68 and 74 are wound) and the resistances 68 and 74, themselves, are at some reference temperature (maintained by the heat sink clamps 46 and 48), and the center of the waveguide portion 50 along with the resistances 70, 72 is elevated in temperature by $\theta$ degrees centigrade (by the power flowing through the waveguide). The ratio of the detector voltage $V_d$ (output voltmeter 40) due to the unbalanced bridge to the voltage $E$ (power source 42) is then:

$$\frac{V_d}{E} = \frac{k\theta}{2+k\theta} \quad (1)$$

where $\theta$ is the temperature difference between the center and ends of the calorimeter, and $k$ is the temperature coefficient of resistance of the wire used. If both $k$ and $\theta$ are relatively small, so that their product is much less than 2, then the above equation may be written as $$\frac{V_d}{E} = \frac{k\theta}{2} \quad (2)$$

Combining Equation 2 above with a theoretical equation (not included) defining the temperature rise to be expected in the middle of a calorimeter constructed of a given metal of given dimensions, provides an expression for the voltage output of the bridge per unit power flowing through the waveguide:

$$\frac{V_d}{P_{in}} = \frac{0.0575 l^2 k \alpha E}{aK} \quad (3)$$

where $P_{in}$ is the average power entering the waveguide, $l$ is one-half the length of the calorimeter, $\alpha$ is the attenuation of the waveguide in db per unit length, $a$ is the cross-sectional metal area of the waveguide, and $K$ is the thermal conductivity of the waveguide metal. Equation 3 above may thus be utilized to predict the amount of output signal expected from a given calorimeter.

Equation 3 further indicates that the sensitivity of the calorimeter is determined by the waveguide material. It is slightly disadvantageous to build the calorimeter of the present invention using a waveguide of a uniform material in that it is desirable to have a high waveguide attenuation in order to have a reasonable output, as well as desirable to have a high thermal conductivity in order to have a short device response time. In the case where it is desirous to have a reasonable center temperature rise and a short time constant, it is expedient to select a waveguide material with large thermal conductivity and large attenuation. These are generally mutually exclusive qualities; therefore, the solution is to coat the inside of a high-thermal-conductivity waveguide with a lossy material to give the waveguide a high attenuation. This is generally applicable in the case of the flange embodiment of FIGURE 1, and can be applied to the clamp embodiment of FIGURE 4 which utilizes an existing waveguide portion, the inside of which naturally cannot be coated unless disassembled. For example, the calorimeter embodiments described herein were constructed of 304 stainless steel waveguide, for the thermal and electrical properties of 304 stainless steel provide, according to Equation 3, a calorimeter that is more sensitive than one using other common waveguide metals. The response time using 304 stainless steel is, however, longer than it would be if other metals were used. One possible coated construction would be the combination of copper waveguide with a stainless steel inside coating; such a configuration will produce a calorimeter with a reasonable sensitivity and a short response time. Other coated constructions embodying more easily deposited materials, such as graphite, might be used.

As an example, the flange type of calorimeter of FIGURE 1 was made utilizing a 3.75 inch length of 3.00 x 1.50 inch x 0.065 inch walled stainless steel waveguide 12, and copper, water circulating, vacuum sealing flanges 14, 16 as heat sinks. An alloy wire of 70 percent nickel and 30 percent iron was utilized to wind the resistances 32, 34, 36, 38 as the best compromise between the conditions of high temperature coefficient of resistance and high tensile strength. The resistance values were chosen as about 200 ohms each (at 26° C.) so that the total bridge generated power was less than 2 percent of the power absorbed by the calorimeter when the input power equalled 100 watts and the bridge input equalled 1 volt. The small 1 ohm trimming resistance 44 was included to balance the bridge. Pertinent constants for the calorimeter are:

$l = 3.80$ cm.
$a = 3.66$ cm.$^2$.
$k = 4.5 \times 10^{-3}/°$ C.
$E = 1.0$ volt, assumed.
$K = 1.506 \times 10^{-1}$ watts/° C.-cm.
$s = 0.502$ joules/° C.-gm. (the product of the thermal capacity).
$\rho = 7.93$ gm./cm.$^3$ (the density).
$\alpha = 0.04698$ db/ft.

The sensitivity of the calorimeter is then 13.25 millivolts out per volt input to the bridge, per kilowatt of power flowing through the calorimeter.

Equation 3 may be written as:

$$P_{in} = \frac{V_d a K}{0.0575 l^2 k \alpha E} = V_d C \qquad (4)$$

where C is a constant. Substituting the above-noted pertinent constants for the present calorimeter in Equation 4, derives the value of $C = 75.5$ (where $V_d$ is in volts and $P_{in}$ in kilowatts). When the bridge circuit is balanced, $V_d = 0$ and $P_{in}$ is zero.

While the present invention has been hereinbefore described with respect to a preferred embodiment, it will be apparent that numerous modifications and variations are possible within the spirit and scope of the invention, and thus it is not intended to limit the invention except by the terms of the following claims.

What is claimed is:

1. An in-line calorimeter wattmeter for measuring the average high frequency microwave power propagated through a waveguide of a waveguide transmission system comprising first heat-sink means disposed in-line with and in temperature conducting relation to said waveguide spaced from said first heat-sink means a distance equal to an integral number of wavelengths of said propagated microwave power and in-line with and in temperature conducting relation to said waveguide, said heat-sinks coacting with the extended length of waveguide therebetween during microwave heating thereof to produce along the length of said waveguide a temperature gradient having a relatively increased temperature at the central region thereof in comparison to the temperatures in the regions of the heat-sinks, and temperature-sensing means disposed at spaced positions along said waveguide length between said heat-sinks in temperature sensing relation with the walls of the waveguide for ascertaining the magnitude of a temperature gradient established by the attenuation of microwave power propagated through said waveguide and said wattmeter.

2. The in-line calorimeter wattmeter in accordance with claim 1 wherein said temperature-sensing means comprises a balanced resistance bridge circuit having resistance means thermally coupled to and spaced along the length of said waveguide, wherein the resistance of said resistance means varies in relation to the temperature of its respective adjacent portion of said waveguide to cause an unbalance of said resistance bridge circuit which is proportional to the power passing through said waveguide.

3. The in-line calorimeter wattmeter in accordance with claim 1 wherein said first and second heat-sinks comprise first and second demountable clamps respectively, said clamps having coolant passage means formed therein for circulating a coolant therethrough, and said waveguide comprises a portion of waveguide of said waveguide transmission system, wherein said first and second demountable clamps are demountably assembled in temperature conducting relation about the extremities of said portion of the waveguide and are spaced apart a distance equal to an integral number of wavelengths of said propagated microwave power.

4. The in-line calorimeter wattmeter in accordance with claim 1 wherein said waveguide comprises a length of waveguide formed of copper and a coating of lossy material disposed on the inside surfaces thereof.

5. An in-line static calorimeter wattmeter for measuring the average microwave power in an existing waveguide comprising a first continuous clamp demountably bolted circumjacently about said existing waveguide in temperature conducting relation therewith, a second continuous clamp demountably bolted circumjacently about said existing waveguide in temperature conducting relation therewith and spaced from said first clamp a distance equal to an integral number of wavelengths of said propagated microwave power, means including coolant passages formed in said clamps for circulating a coolant of predetermined temperature through said clamps, a first resistance wire wound about said existing waveguide immediately adjacent one clamp, a second and third resistance wire wound about said existing waveguide midway between said clamps and electrically insulated one from the other, a fourth resistance wire wound about said existing waveguide immediately adjacent the other clamp, said resistance wires being of equal resistances and connected to form a resistance wire bridge circuit, and electrical power supply means and output voltmeter means coupled to said resistance bridge circuit.

References Cited by the Examiner
UNITED STATES PATENTS
2,496,541  2/1950  Johnson _____ 324—95
FOREIGN PATENTS
760,356  10/1956  Great Britain.

WALTER L. CARLSON, *Primary Examiner.*
RUDOLPH V. ROLINEC, *Assistant Examiner.*